United States Patent [19]

Weinreich

[11] Patent Number: 4,971,312
[45] Date of Patent: Nov. 20, 1990

[54] ILLUSION APPARATUS

[76] Inventor: Stephen Weinreich, 14 Norton Rd., Monmouth Junction, N.J. 08550

[21] Appl. No.: 356,063

[22] Filed: May 23, 1989

[51] Int. Cl.$^5$ .............................................. G02B 5/08
[52] U.S. Cl. ................... 272/8 M; 350/274; 350/600
[58] Field of Search .................. 272/8 M, 8.5, 8 P, 10; 350/272–275, 288–291; 356/391–394

[56] References Cited

U.S. PATENT DOCUMENTS

| | | |
|---|---|---|
| 922,722 | 5/1909 | Sallé . |
| 936,344 | 10/1909 | Myers . |
| 1,236,196 | 8/1917 | MacQuestin . |
| 1,775,237 | 9/1930 | Dawley et al. . |
| 1,785,347 | 12/1930 | Herrschaft . |
| 2,075,198 | 3/1937 | Henze et al. . |
| 2,146,386 | 2/1939 | Todd . |
| 2,165,736 | 7/1939 | Twele . |
| 2,222,084 | 11/1940 | Marx . |
| 2,232,110 | 2/1941 | Gruenhut . |
| 2,232,547 | 2/1941 | Mathias . |
| 2,273,259 | 2/1942 | Gosling . |
| 2,494,000 | 1/1950 | Robertson . |
| 2,875,528 | 3/1959 | Garate . |
| 2,899,860 | 8/1959 | Scott et al. . |
| 3,000,261 | 9/1961 | Frenkel . |
| 3,729,839 | 5/1973 | Bourdier . |
| 4,072,314 | 2/1978 | Rosen et al. . |
| 4,094,501 | 6/1978 | Burnett . |
| 4,157,633 | 6/1979 | Reiner et al. . |
| 4,273,418 | 6/1981 | Gillespie et al. . |

OTHER PUBLICATIONS

"The Technique of Special Effects Cinematography" by Raymond Fielding, 3rd Ed., Focal Press, 1972 (pp. 74–77).

"Magic Stage Illusions, Special Effects and Trick Photography" compiled by Albert Hopkins, reprinted by Dover Press, 1976, Pgs. 8, 55–60, 86–87 and 520–523.

Primary Examiner—Richard E. Chilcot, Jr.
Attorney, Agent, or Firm—Mathews, Woodbridge and Collins

[57] ABSTRACT

An illusion apparatus comprises a semi-transparent convex, spherical mirror which makes the image of a primary object, ordinarily a human viewer, appear to interact with a display means such as a television set or a picture or a diorama. The semi-transparent, convex, spherical mirror is located between the viewer and the display means. The viewer is preferably illuminated against a dark backdrop. Because the spherical mirror is semi-transparent, the viewer sees a composite image which includes his own reflection superimposed on a portion of the scene from the television, picture, or diorama behind the mirror. A darkened area is preferably located on the television screen or in the picture or diorama and corresponds to the size and location of the viewer's image. This prevents the scene in the television or diorama from bleeding through the viewer's image. A mirror supporting stand makes it possible to adjust the height of the mirror with respect to the viewer and the display means so as to fine tune the effect. The effect can be modified by using convex, aspherical mirrors for special situations and by adding interactive feedback between the viewer and the television set or diorama so that the viewer can control his environment in the composite image.

24 Claims, 5 Drawing Sheets

ILLUSION APPARATUS

BACKGROUND OF THE INVENTION

1. Field of the Invention

The invention relates to an illusion apparatus including a semi-transparent, convex, spherical mirror for making the image of the viewer appear to be located on the surface of a television screen or picture or in a diorama.

2. Description of Related Prior Art

The use of mirrors and related optics to achieve illusions is known in various parts of the prior art. Two useful background references are "The Technique of Special Effects Cinematography," by Raymond Fielding, Third Edition, Focal Press, 1972 (see, in particular, pages 74–77) and "Magic Stage Illusions, Special Effects and Trick Photography," compiled by Albert Hopkins, reprinted by Dover Press, 1976, (See, specifically, pages 8, 55–60, 86–87 and 520–523).

The following U.S. Patents generally relate to the use of optics to produce theatrical effects: U.S. Pat. Nos. 922,722; 1,775,237; 1,785,347; 2,222,084; 2,232,547 and 4,094,501.

Mirrors and related optical devices have also been employed to superimpose images for advertising purposes. See specifically, U.S. Pat. Nos. 936,344; 2,146,386; 2,165,736; 2,232,110 and 2,273,259.

The optical superposition of images is useful as a teaching aid. See, for example, U.S. Pat. No. 2,875,528 in which a swimmer is superimposed in a swimming environment. Similarly, see U.S. Pat. Nos. 2,494,000 and 3,000,261 in which superimposed images are used to teach an individual how to play golf.

Optically superimposed images are also useful for giving an individual a preview of himself or herself in a particular fashion environment. For example, U.S. Pat. Nos. 2,075,198 and 2,899,860 disclose previewing devices in which a human head is superimposed upon a new hair fashion to give the viewer an idea of what he or she would look like with the new hair style. Similarly, clothing fashions can be previewed by optically superimposing an image of the viewer upon the new fashion wear. In this regard, note U.S. Pat. Nos. 1,236,196 and 3,729,839. U.S. Pat. No. 4,157,633 discloses a fashion preview invention in which the subject is a doll and images of different clothing fashions are superimposed upon the doll's image.

The superposition of faces where a portion of the background is mixed with foreground, are described in the patent literature. See, for example, U.S. Pat. Nos. 4,072,314 and 4,273,418.

SUMMARY OF THE INVENTION

Briefly described, the invention comprises an illusion device by which a viewer can superimpose his image on a portion of a television screen or picture or in a diorama. A semi-transparent, convex, spherical mirror is placed between the viewer and a display means such as a television set, picture or diorama. The mirror is half-silvered in such a way that the viewer sees a composite image which includes the reflection of him or herself superimposed on a portion of the television scene or a picture or in a diorama on the other side of the mirror. The television or diorama preferably includes a blacked-out portion roughly corresponding to the image of the viewer so that the viewer does not see the scene behind bleeding through his image but rather sees his image in the context of the scene around it. Lights and a neutral or black backdrop or a backdrop chosen to fit are preferably located near the viewer so as to help define the viewer's image in the scene. If a diorama or picture is used as the display means, a second source of illumination may be provided adjacent to the display means. A height adjustable stand supports the mirror and is employed to change the position of the mirror to improve the illusion. The radius of curvature of the spherical mirror and the distance between the viewer and the mirror and the mirror and display means are such as to improve the illusion in terms of depth stabilization which is balanced against image size and optical aberration considerations.

According to one alternative embodiment the viewer stands on a switch mat which is connected to a video game system which is connected to the television set. In this manner the viewer can interactively control his television environment. According to another alternative embodiment, aspherical mirrors are employed to produce special controlled distortions of the viewers image.

These and other features of the invention will be more fully understood by reference to the following drawings.

DETAILED DESCRIPTION OF THE INVENTION

During the course of this description, like numbers will be used to identify like elements according to the different figures which illustrate the invention.

Figure 1:
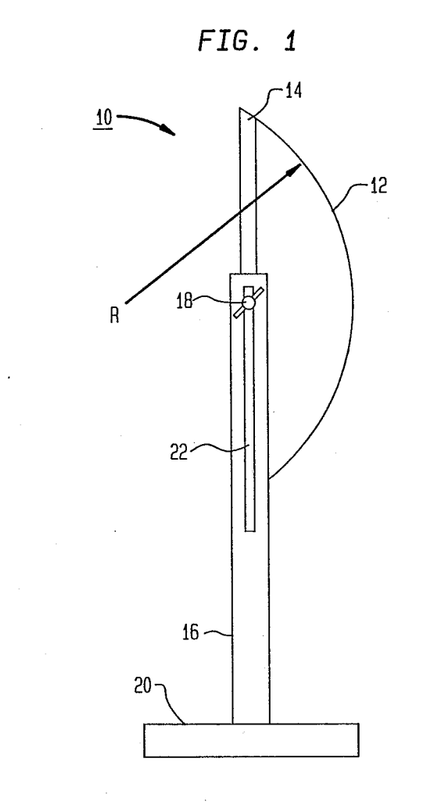
FIG. 1 is a side elevational view of the preferred semitransparent, convex, spherical mirror of this invention.
Figure 2:
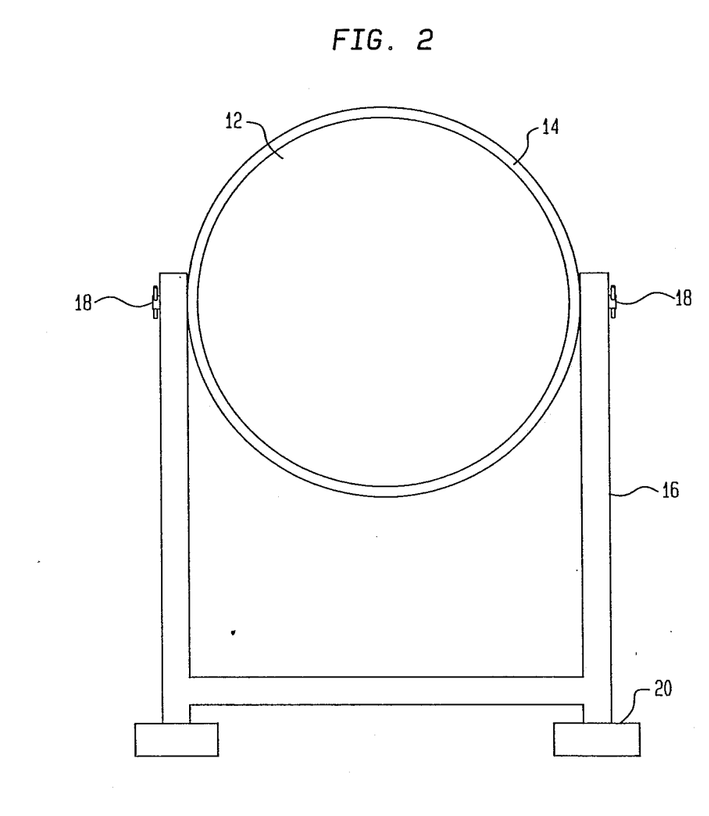
FIG. 2 is a front elevational view of the preferred semi-transparent, convex, spherical mirror illustrated in FIG. 1.

The heart of the invention 10 is the half-silvered mirror 12 illustrated in FIGS. 1 and 2. Mirror 12 is preferably a convex, spherical mirror which is partially silvered so that a viewer standing in front of the mirror 12 sees his or her image superimposed upon objects located behind the mirror 12. Mirror 12 is supported by a circumferential frame 14 which is held by an adjustable stand 16. The height of the mirror 12 above the floor is adjustable by means of wing nuts 18 which travel up and down slots 22. The position or height of the mirror 12 is changeable by setting the wing nuts 18 at various different locations along the slot 22 The wing nuts 18 are on threaded studs attached to the mirror frame 12. Feet 20 support the upright members of the adjustable stand 16. Since convex mirror 12 is a portion of a sphere, it is characterizable by a radius R.

The apparent focus, "prime focus" or "principal focus", is very nearly one-half of the radius of curvature for a convex spherical mirror. Parallel rays of light will reflect from the convex spherical mirror as if emanating from the principal focus. Ordinary means of optical analysis, such as ray tracing, will determine an image position between the mirror and the principal focus.

Figure 3:
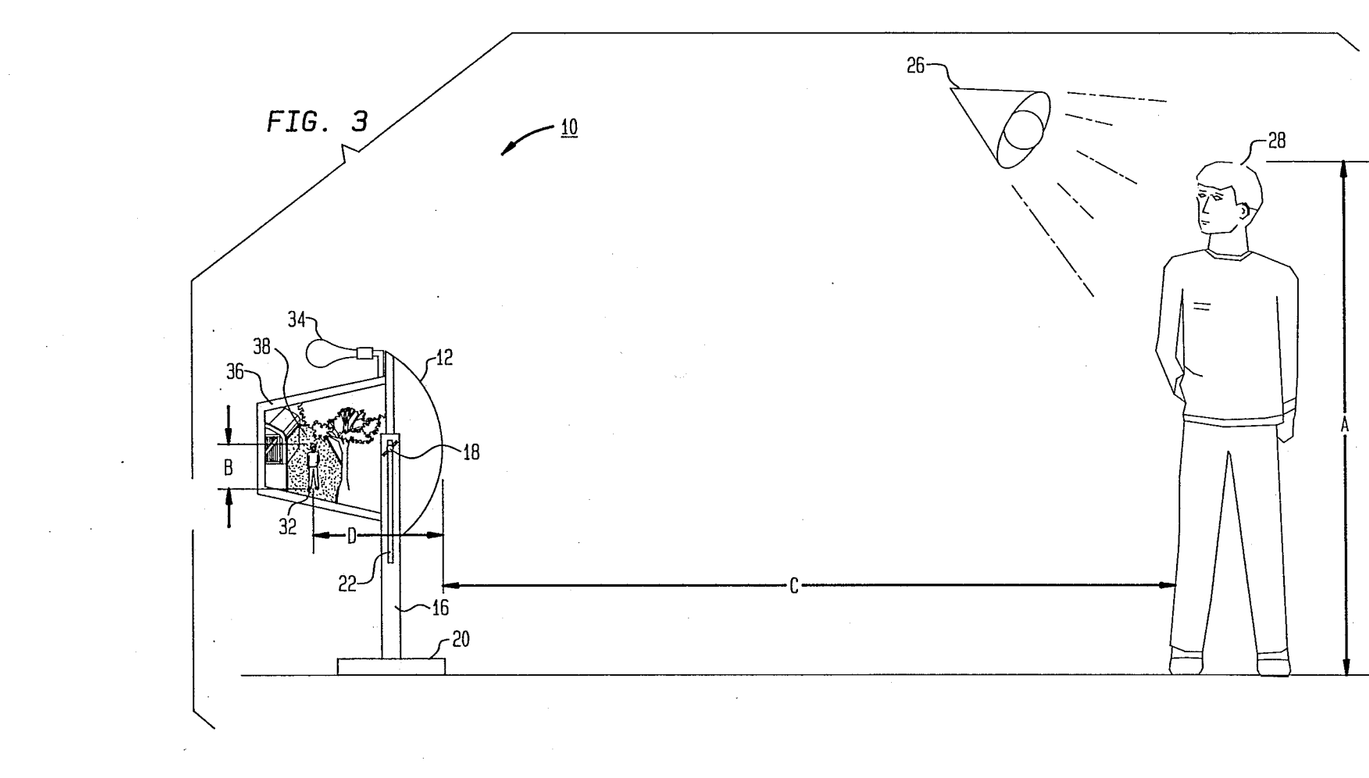
FIG. 3 illustrates an embodiment of the invention where the image of a viewer is superimposed in a diorama.

FIG. 3 illustrates one embodiment of the invention 10 in the context of a diorama 36. A first light source 26 illuminates the viewer 28 who is located a distance C from mirror 12. A second light source 34, in the form of a dimmable bulb, illuminates the diorama 36.

A reduced image 32 of height B of the viewer 28 having a height A is seen by the viewer 28 (or other viewers) at a distance D behind the surface of semi-transparent mirror 12. Viewer image 32 is preferably located at a position where there is a darkened portion 38 suitable to receive viewer's image 32. In this manner, the diorama scene 36 does not bleed through the viewer's image 32.

Figure 4:
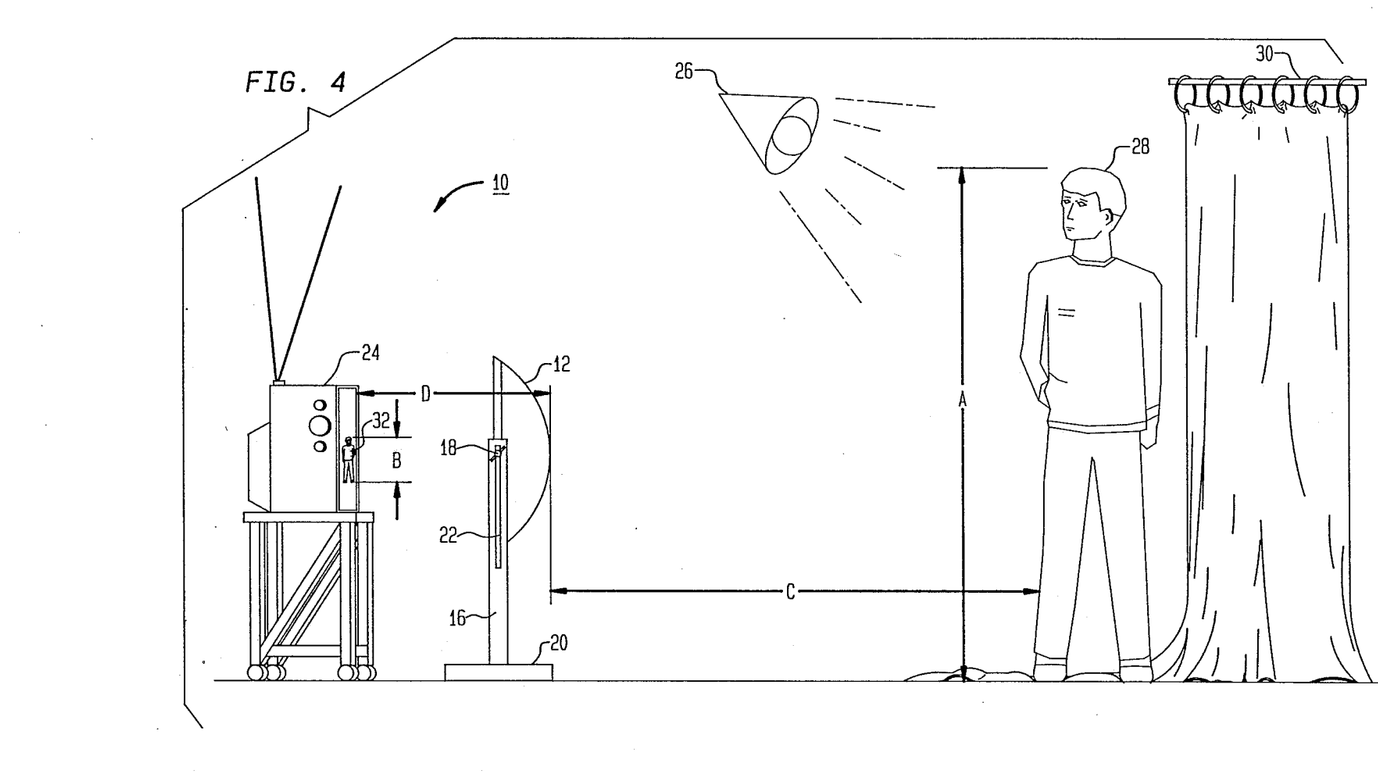
FIG. 4 illustrates the preferred embodiment of the invention where the image of the viewer is superimposed upon a television screen.

The preferred embodiment of the invention 10 is illustrated in FIG. 4. The major difference between the embodiments in FIGS. 3 and 4, is that in FIG. 3, the display means comprises a diorama 36 whereas in FIG. 4, the display means comprises the screen of a television set 24. A black, or neutral drape 30 is illustrated behind and beneath the viewer 28. Drape 30 prevents the background behind the viewer 28 from being part of the image 32 seen by the viewer 28 in the mirror 12. Drape 30 could also have been employed behind the viewer 28 illustrated in FIG. 3. The viewer 28 having a height A shown in FIG. 4 is located a distance C from the mirror 12. The screen of the television set 24 is located a distance D on the other side of mirror 12 from the viewer 28. The viewer 28 looking at mirror 12 sees an image 32 of him or herself having a height B, superimposed upon the screen of the television set 24. As with the diorama 36, the image 32 is preferably located over a darkened out section 38, shown in FIGS. 6A and 6B, which prevents the scene on the television screen from bleeding through the image 32.

By placing the semi-transparent, convex mirror 12 between the viewer 28 and the display means (e.g. television 24, diorama 36, or a printed picture, etc.) and illuminating the viewer 28 and the scene, the viewer's image 32 will appear in the scene. Furthermore, the image 32 will appear in the same position for widely spaced viewers.

In order to add interest to the effect, elements of the scene may be animated (as is basically expected for TV use) and may further be controlled by the viewer 28. Creative use of control effectors can give the illusion of the image 32 having physical contact with elements of the scene.

Figure 5:
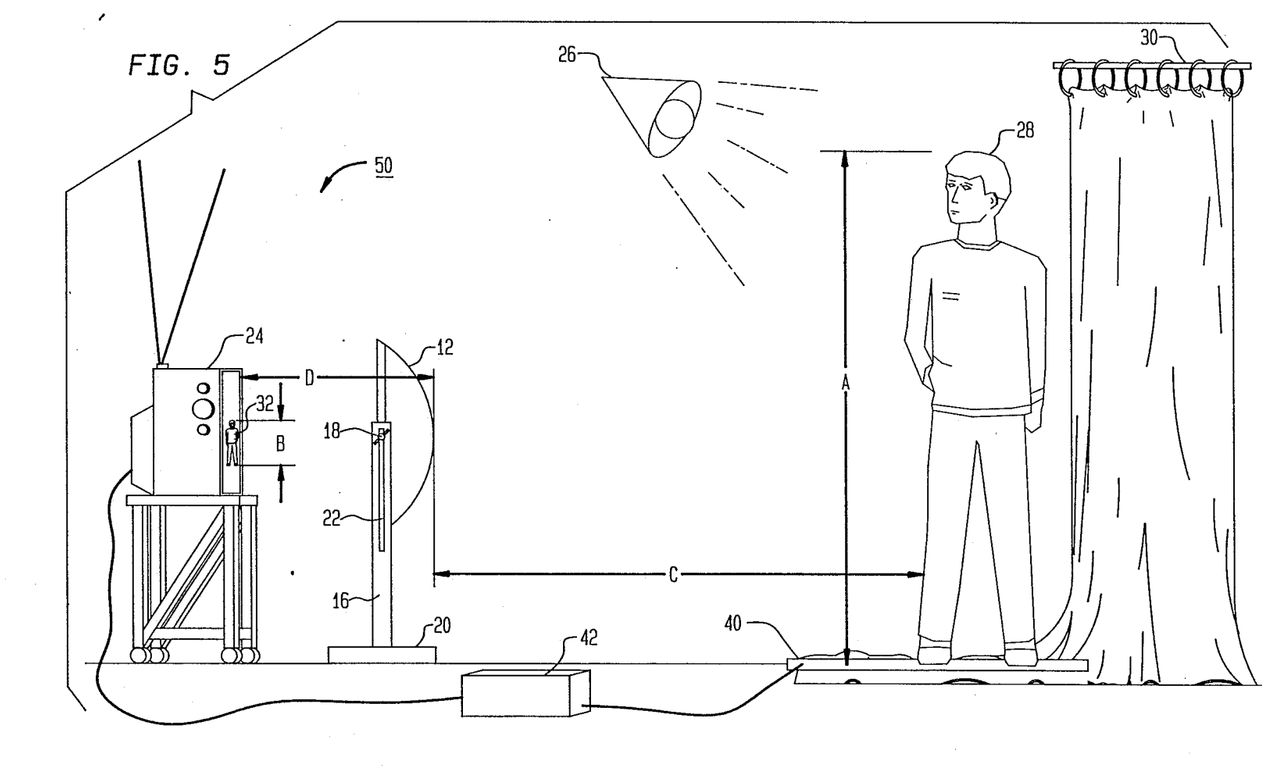
FIG. 5 illustrates an alternative embodiment in which the viewer controls the action on a television screen while his image is superimposed thereon.

An alternative version 50 of the preferred embodiment illustrated in FIG. 4 is shown in FIG. 5. A switch mat 40 is illustrated under the feet of the viewer 28. Switch mat 40 is connected by wires to a video game system 42 which in turn is connected to the television set 24. The video game system 42 shown in FIG. 5 can be any one of many generally available electronic games or computer systems such as made by Nintendo or Sega. The switch mat 40 is identical or similar to those manufactured by Tapeswitch Corporation of America, 100 Schmitt Blvd., Farmingdale, N.Y. 11735. Several Tapeswitch mats 40 can be joined with appropriate connectors to the video game system 42 or the Tapeswitch Corporation can manufacture a segmented mat 40 for connection to the system 50. The purpose of switch mat 40 and the video game system 42 is to provide interactive control between the viewer 28 and the television 24. Accordingly, the viewer 28 can modify the context in which the image 32 is operating. This allows the viewer 28 to continually change the nature of his image's experience depending upon the position of his feet upon switch mat 40. For example, if the viewer were playing an adventure game a dragon might back away from the approaching image 32 or an "explosion" might occur under his image 32 if the viewer 28 moved to a forbidden position on the mat 40.

Figure 6A:
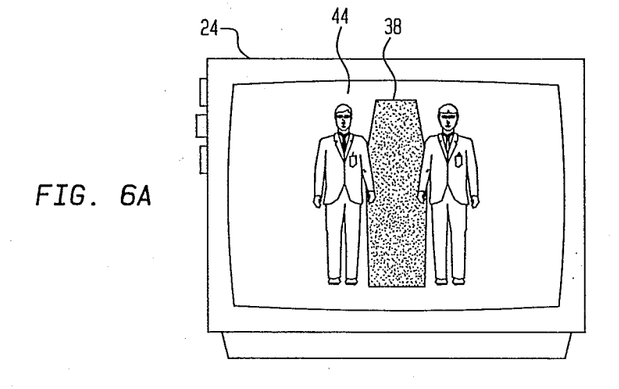
FIG. 6A illustrates the surface of a television screen with a portion blackened out to receive the image of the viewer.
Figure 6B:
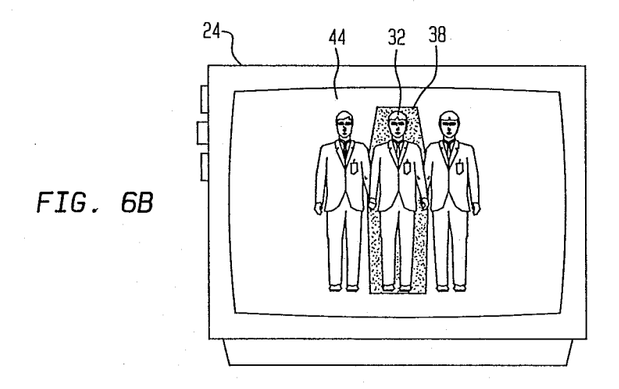
FIG. 6B illustrates the television screen of FIG. 6A with the viewer's image superimposed upon the blackened out portion.
Figure 7A:
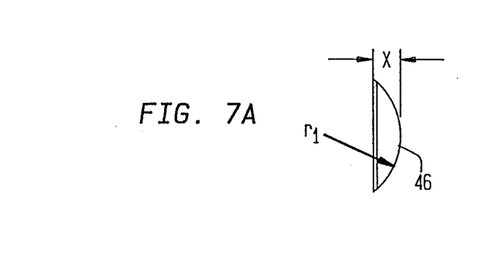
FIG. 7A is a side view of an aspherical mirror having a first radius of curvature $r_1$.
Figure 7B:
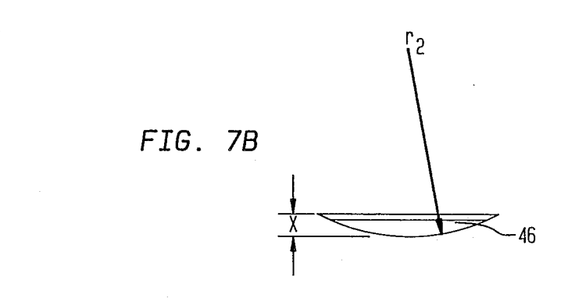
FIG. 7B is a top plan view of the aspherical mirror shown in FIG. 7A having a second radius of curvature $r_2$.
Figure 7C:
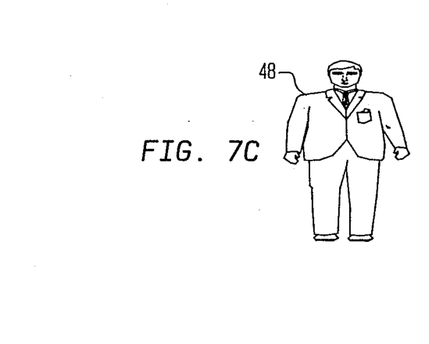
FIG. 7C illustrates a distorted image of the viewer produced by the partially silvered, aspherical mirror shown in FIGS. 7A and 7B.

Darkened section 38 is shown without a superimposed image in FIG. 6A. A scene 44 on the screen of television 24 includes the darkened section 38 located between two animated figures. The darkened section 38 should correspond roughly to the area of movement of the image 32 or may move with the expected positions of image 32 or may be controlled by the position of viewer 28 to follow the position of image 32. The purpose of darkened section 38 is to make sure that little or none of the animated scene 44 bleeds through the image 32. Image 32 is illustrated superimposed on darkened section 38 in FIG. 6B. A substantially bright image largely overcomes the hands of the figures protruding into darkened area 38. FIGS. 7A and 7B illustrate a use of aspherical half-silvered mirrors to produce special, intended distortions. The half-silvered mirror 46 has a first radius $r_1$ as shown from the side in FIG. 7A and a larger second radius $r_2$ as shown from the top in FIG. 7B. Accordingly mirror 46 has a pair of radiuses $r_1$ and $r_2$ which produce an astigmatic effect shown in FIG. 7C. Image 48 illustrates the effect that a viewer 28 would observe if looking at the front of mirror 46. Image 48 is shortened more from top to bottom then from side to side thereby making the image 48 look fatter than it would if the mirror 46 were spherical. Aspherical mirrors, such as mirror 46, provide the option of producing special, intended distortions, for special purposes. For example, if the image 48 were that of an astronaut on a planet with a very strong gravity field, it would produce the effect that the astronaut's body was being dragged down by the strong effects of the gravitational field. Or, it may be desired to distort the orientation of the image for other special effects such as to enhance the illusion of the image floating in an outer space environment.

The invention 10 has been described in the context of a television set 24 or a diorama 36. It could also be used with a printed picture or for other applications. The invention 10 could be used, for example, for toys (such as a doll house through which a child could appear to walk) or advertising (for example, to introduce the viewer into the world of product "X") or for training (with the participant mimicking tennis strokes alongside of a tennis star on television).

The effect can be varied by changing certain parameters. As previously discussed, areas 38 within the scene (television 24, diorama 36 or picture) are preferably darkened to receive the image 32. Alternatively, where the viewer 28 is lit far more brightly than the scene or where the mirror 12 is of high reflectivity (and therefore low transmissiveness) the image 32 will wash out the scene area in which it appears thus allowing image 32 to be dominant anywhere throughout the scene. For such effects as the subject appearing to be a ghost, a darkened area is not required. Moreover, the adjustability of the relative brightness can be accomplished by changing the brightness control of the television 24 or, in the case of the diorama 36, through the use of an adjustable shutter. Mirror 12 is preferably thin so as to minimize secondary reflections and it should be of uniform thickness unless special effects or corrections are desired.

In the case of a diorama 36, it is possible to use negative lenses or negative Fresnel lenses to introduce objects or people behind the scene into the action. Also, additional semi-transparent or full-silvered mirrors could be used within the scene advantageously. In order to add interest to the effect, the elements of a diorama scene might be animated and further controlled by the viewer 28 electrically as was described with respect to alternative embodiment 50 shown in FIG. 5 or by direct mechanical connections such as levers or cords.

One of the important features of the invention is the effect of depth stabilization. In general, this is taken advantage of where the mirror's radius of curvature R is relatively small and the viewer 28 is located sufficiently distant from the mirror 12.

The mathematical relationship between the distance of the object to the mirror (C), the image to the mirror (D) and the radius of the mirror (R) is expressed as follows:

$$\frac{1}{C} + \frac{1}{D} = \frac{-2}{R}$$

Note: The negative result indicates that the image 32 is behind the mirror 12.

Also the following mathematical relationship exists between the image height (B), the object height (A), the image distance to the mirror (D) and the object distance to the mirror (C).

$$\frac{B}{A} = \frac{-D}{C}$$

Therefore, looking at expected image position and size for a 5'9" viewer 28 at distances of 4', 8' and 12', respectively, (ignoring aberrations) one can derive the following results where:
Radius of Mirror R=8"
Height of Viewer 28=A=69"

| Object Distance to Mirror (C) | Image Distance to Mirror (D) | Image Height (B) |
|---|---|---|
| 48 inches | −3.69 inches | 5.31 inches |
| 96 inches | −3.84 inches | 2.76 inches |
| 144 inches | −3.89 inches | 1.86 inches |

(Note: Negative numbers indicate distance behind the mirror 12.)

It has been found that with a convex, spherical mirror 12 having an 8" radius R, a 5'9" (A) viewer 28 standing 8' (C) from the mirror 12 will form an image 32 about 2¾" (B) tall at a distance just under 4" (D) behind the face of the mirror 12. This is of sufficient size for a small television 24 or diorama 36.

Using such a mirror 12, the viewer 28 can back away up to a distance of 12', for example, and cause the image 32 to shrink over 30% while maintaining almost the same distance behind the mirror 12. Basically, the further the viewer 28 is from the mirror 12, in terms of the radius R of the mirror 12, the more stable will be the image's depth position. This depth stabilization is highly advantageous when the concept is applied to a television set 24 and may be exploited in the programming of the television image for greater play value. The use of the concept with respect to printed images also produces the same benefits. The effect of depth stabilization is maximized as the image distance D approaches one-half of the radius of curvature of mirror 12.

The implications of depth stabilization are further described as follows. Basically, the image 32 must remain close to the surface plane of the television 24 in order to appear to be part of the television image 44. Without depth stabilization the viewer 28 would be constrained to a fairly limited distance C from the mirror 12, in order to maintain a constant image distance D. With depth stabilization, attributable to the convex nature of the mirror 12 and the distance C of the viewer, the image 32 remains near the surface plane of the television screen while growing and shrinking to indicate up and down stage motion or to fit into a new scene 44 or to adjust for the size of the viewer 28.

Depth stabilization is not an advantage with regard to dioramas 36. In order to enhance the effect, dioramas, such as diorama 36, can be built in forced perspective, i.e. built with the smaller scale items in the back and larger scale items in the front so as to give the illusion of greater depth. Furthermore, the image forming system for a diorama 36 should be so arranged that the viewer 28 is closer to the mirror 12 in relation to the radius of curvature R of the mirror 12 thus yielding greater depth motion of the image 32. The partial reflectivity (or partial transparency) of the mirror 12 can be created by ordinary means directed either to the density of the reflective coating or to a coating pattern. Alternatively, the reflectivity may be integral to the material rather than applied as a coating. The mirror 12 should preferably be as thin as possible for economy and ease of manufacture but thick enough to ensure integrity of the material so that it does not crack or break. It is generally desired that the mirror 12 be of constant thickness except where special effects are desired. According to the preferred embodiment the mirror 12 is approximately 3/32 of an inch thick for a radius of 8" and formed out of acrylic plastic. It could be somewhat thinner if vacuum formed from blister pack materials. Mirror 12 is preferably 50% reflective but could range from clear glass (or other material) to fully reflective (for the special case where the image is to appear "buried" in a scene). The preferred range of mirror reflectivity is approximately 25% to 75%. The preferred range of mirror size is slightly larger than ordinary television picture tube diagonal measurements. Thus the mirror size would be roughly twelve to thirty inches in diameter or cut to a 4:5 rectangle with those diagonal measurements. The preferred radius R of mirror 12 is 8" and the preferred range of mirror radii of curvature R is approximately 8" to 48".

Convex mirrors are made generally of glass and acrylic by certain American manufacturers. Partially reflective mirrors are also manufactured domestically. A few manufacturers produce convex mirrors that are also partially reflective and those include the Mir-Acryl Company of Belleville, Mich. which makes convex partially reflective mirrors for surveillance purposes.

The vertical position of the image 32 may be adjusted somewhat by translating the mirror 12 upward or downward on the frame 16 by mean of adjustable wing nuts 18. This might be necessary particularly for a television set 24 having a fixed vertical position. If the television set 24 is lower than the standard, then the image 32 may be lowered by lowering the mirror 12 in relationship to the television set 24. This adjustment may increase the spherical aberration due to the increased difference between the subject's head to mirror distance and his/her foot to mirror distance. However, this distortion is usually acceptable within reasonable limits.

Further correction to the aberrations induced by a particular configuration can be achieved by asphericity consistent with the conditions. A small diorama 36 placed on the floor and used by a standing viewer 28 would require its mirror 12 to increase in radius R towards the top to account for the greater distance to the subject's head. The successive centers of curvature could be displaced to create as vertical an image as possible. Alternatively, it might be desired to distort the orientation of image 32 for particular special effects such as to enhance the illusion of the image 32 floating in an outer space scene.

There are potential uses for many different sets of distances, curvature, aberrations etc. The relationships are readily derivable from the equations previously described and provable by conventional ray tracing. Even situations which can lead to fairly serious optical aberrations may be useful. The present invention takes advantage of the convex nature of the half-silvered mirror which presents major advantages over the prior art use of flat mirrors. The advantages, for example, are that it is possible to incorporate an image in a substantially small diorama, picture or scene thus producing economies of scale, portability etc. Also depth stabilization is possible using curved mirrors which is not possible with the flat mirrors due to the flat mirror's one to one (1:1) correspondence between the distance and size of the image and the distance and size of the viewer. The depth stabilization allows the image 32 of viewer 28 to remain at the surface of the printed picture or TV screen while allowing the viewer to move toward and away from the screen. Additional advantages of sufficiently convex mirrors include the ability to tailor image size without requiring the mirror to be repositioned in relationship to the scene or screen.

The preferred embodiment described is reasonable for a twelve inch portable television 24 or a diorama 36 in that size range.

While the invention has been described with reference to a preferred embodiment thereof, it will be appreciated by those of ordinary skill in the art that modifications ca be made to the invention without departing from the spirit and the scope thereof.

I claim:

1. An illusion apparatus for making an object appear to be inside or on the surface of a display means, said apparatus comprising:

a partially reflective, partially transparent convex mirror located between said primary object and said display means for making an image of said primary object appear to interact with said display means; and, a vertical mirror height adjustment means attached to said mirror for adjusting the position of said mirror with respect to said display means, wherein said mirror is convex in the direction of said primary object so as to diminish the size of said image.

2. An illusion apparatus for making a primary object appear to be inside or on the surface of a display means, said apparatus comprising:

a convex mirror located between said primary object and said display means for making an image of said primary object appear to interact with said display means, wherein said mirror comprises a partially reflective, partially transparent mirror and is convex in the direction of said primary object so as to diminish the size of said image.

3. The apparatus of claim 2 wherein said primary object is adapted to be used by or with a human being.

4. The apparatus of claim 2 wherein said display means comprises a two dimensional display means.

5. The apparatus of claim 4 wherein said two dimensional display means comprises a television.

6. The apparatus of claim 2 wherein display means comprises a three dimensional display means.

7. The apparatus of claim 6 wherein said three dimensional display mean comprises a diorama.

8. The apparatus of claim 7 wherein said diorama is constructed in forced perspective.

9. The apparatus of claim 2 further comprising:
   at least one darkened area in said display means corresponding to the location in said display means where said image appears,
   wherein the image of said primary object substantially appears in the darkened area of said display means.

10. The apparatus of claim 2 further comprising:
    first illuminating means for illuminating said primary object.

11. The apparatus of claim 10 wherein said first illuminating means comprises:
    a first light source for lighting said primary object from a location between said primary object and said mirror.

12. The apparatus of claim 2 further comprising:
    a backdrop means located on the opposite side of said primary object from said mirror.

13. The apparatus of claim 7 further comprising:
    a second illuminating means for illuminating said diorama said second illuminating means located on the opposite side of said mirror from said primary subject.

14. The apparatus of claim 13 wherein said second illuminating means comprises a dimmable illuminating means.

15. The apparatus of claim 2 further comprising:
    a stand for supporting said mirror; and,
    a mirror height adjustment means attached to said mirror and to said stand for adjusting the position of said mirror with respect to said primary object and said display means.

16. The apparatus of claim 2 wherein said mirror comprises a spherical mirror.

17. The apparatus of claim 2 wherein said mirror comprises an aspherical mirror.

18. The apparatus of claim 2 wherein the distance of the image to said mirror approaches one-half of the radius of said mirror.

19. The apparatus of claim 2 further comprising:
control means controllable by said primary object for controlling the scene displayed by said display means.

20. The apparatus of claim 19 wherein said display means comprises a television.

21. The apparatus of claim 20 wherein said control means comprises:

an electronic control means controllable by said primary object; and,
a video game system connected to said electronic control means and to said television.

22. The apparatus of claim 19 wherein said control means comprises a switch mat.

23. The apparatus of claim 16 wherein:
the radius of said spherical mirror is in the range of 8" to 48" inches.

24. The apparatus of claim 21 wherein:
the radius of said spherical mirror is approximately 8".

* * * * *